(12) United States Patent
Gaivoronski et al.

(10) Patent No.: US 10,791,128 B2
(45) Date of Patent: Sep. 29, 2020

(54) INTRUSION DETECTION

(71) Applicant: Microsoft Technology Licensing, LLC, Redmond, WA (US)

(72) Inventors: Svetlana Gaivoronski, Seattle, WA (US); Paul England, Bellevue, WA (US); Mohamed Rouatbi, Bellevue, WA (US); Mariusz H. Jakubowski, Bellevue, WA (US); Marcus Peinado, Bellevue, WA (US); Julian Federico Gonzalez, Jr., Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/718,393

(22) Filed: Sep. 28, 2017

(65) Prior Publication Data

US 2019/0098024 A1 Mar. 28, 2019

(51) Int. Cl.
*H04L 29/06* (2006.01)
*G06F 21/56* (2013.01)
*H04L 12/26* (2006.01)

(52) U.S. Cl.
CPC ......... *H04L 63/1416* (2013.01); *G06F 21/56* (2013.01); *H04L 63/1408* (2013.01); *H04L 63/1441* (2013.01); *H04L 43/08* (2013.01); *H04L 2463/146* (2013.01)

(58) Field of Classification Search
CPC .. H04L 63/1416; H04L 63/1441; H04L 43/08
See application file for complete search history.

(56) References Cited

U.S. PATENT DOCUMENTS

| | | | |
|---|---|---|---|
| 7,013,395 B1 | 3/2006 | Swiler et al. | |
| 8,161,555 B2 | 4/2012 | Spatscheck et al. | |
| 8,776,241 B2 | 7/2014 | Zaitsev | |
| 8,881,288 B1 | 11/2014 | Levy et al. | |
| 8,959,568 B2 | 2/2015 | Hudis et al. | |
| 8,959,643 B1* | 2/2015 | Invernizzi | H04L 63/1425 713/187 |
| 9,027,128 B1 | 5/2015 | Oliver et al. | |
| 9,473,522 B1* | 10/2016 | Kotler | H04L 63/1433 |
| 9,516,053 B1* | 12/2016 | Muddu | H04L 63/1425 |

(Continued)

FOREIGN PATENT DOCUMENTS

EP 2584484 A1 4/2013

OTHER PUBLICATIONS

Houmansadr, et al., "A Cloud-based Intrusion Detection and Response System for Mobile Phones", In Proceedings of IEEE/IFIP 41st International Conference on Dependable Systems and Networks Workshops, Jun. 27, 2011, 2 pages.

(Continued)

*Primary Examiner* — J. Brant Murphy
*Assistant Examiner* — Stephen T Gundry
(74) *Attorney, Agent, or Firm* — Dicke, Billig & Czaja, PLLC

(57) ABSTRACT

A process to detect intrusions with an intrusion detection system is disclosed. The intrusion detection system identifies instance types, and each instance type includes an instance. A know compromised instance is identified from the plurality of instances. A link between the plurality instance types is traversed from the compromised instance to discover an additional compromised instance.

20 Claims, 2 Drawing Sheets

(56) References Cited

U.S. PATENT DOCUMENTS

| | | | |
|---|---|---|---|
| 9,641,550 B2* | 5/2017 | Kraitsman | H04L 63/1408 |
| 9,710,653 B2* | 7/2017 | Kotler | G06F 21/577 |
| 9,712,554 B2* | 7/2017 | Hassanzadeh | H04L 63/1433 |
| 9,716,721 B2* | 7/2017 | Hovor | G06F 16/338 |
| 9,838,410 B2* | 12/2017 | Muddu | H04L 63/1425 |
| 9,846,780 B2* | 12/2017 | Tonn | G06F 21/577 |
| 9,886,581 B2* | 2/2018 | Olson | G06F 21/577 |
| 9,892,260 B2* | 2/2018 | Kotler | G06F 21/577 |
| 9,900,332 B2* | 2/2018 | Muddu | H04L 63/1425 |
| 9,971,894 B2* | 5/2018 | Shear | G06F 21/45 |
| 9,973,519 B2* | 5/2018 | Call | H04L 63/1416 |
| 9,996,567 B2* | 6/2018 | Smart | G06F 17/30327 |
| 2007/0226796 A1* | 9/2007 | Gilbert | G06F 21/55 726/22 |
| 2011/0173693 A1* | 7/2011 | Wysopal | G06F 21/577 726/19 |
| 2012/0240185 A1* | 9/2012 | Kapoor | H04L 41/0866 726/1 |
| 2012/0254333 A1* | 10/2012 | Chandramouli | G06F 17/27 709/206 |
| 2012/0323829 A1* | 12/2012 | Stokes | G06F 21/563 706/12 |
| 2013/0133072 A1* | 5/2013 | Kraitsman | H04L 63/1425 726/23 |
| 2013/0138428 A1* | 5/2013 | Chandramouli | G06F 17/274 704/9 |
| 2014/0196110 A1* | 7/2014 | Rubinstein | H04L 63/08 726/3 |
| 2014/0237599 A1* | 8/2014 | Gertner | H04L 63/1441 726/24 |
| 2014/0380488 A1 | 12/2014 | Datta Ray et al. | |
| 2015/0188949 A1* | 7/2015 | Mahaffey | H04L 63/20 726/1 |
| 2015/0242637 A1* | 8/2015 | Tonn | G06F 21/577 726/25 |
| 2015/0244734 A1* | 8/2015 | Olson | G06F 21/577 726/25 |
| 2015/0347480 A1* | 12/2015 | Smart | G06F 17/30327 707/743 |
| 2016/0080419 A1* | 3/2016 | Schiappa | H04L 63/0263 726/1 |
| 2016/0080420 A1* | 3/2016 | Ray | G06F 16/285 726/1 |
| 2016/0127395 A1* | 5/2016 | Underwood | H04L 63/1425 726/23 |
| 2016/0306979 A1* | 10/2016 | Kotler | G06F 21/577 |
| 2016/0306980 A1* | 10/2016 | Kotler | G06F 21/577 |
| 2016/0308895 A1* | 10/2016 | Kotler | G06F 21/577 |
| 2016/0330219 A1* | 11/2016 | Hasan | G06N 5/025 |
| 2016/0350531 A1* | 12/2016 | Harris | G06F 21/552 |
| 2017/0063886 A1* | 3/2017 | Muddu | G06F 16/285 |
| 2017/0078324 A1* | 3/2017 | Bordawekar | H04L 63/1458 |
| 2017/0085446 A1* | 3/2017 | Zhong | H04L 43/045 |
| 2017/0085447 A1* | 3/2017 | Chen | H04L 43/024 |
| 2017/0093645 A1* | 3/2017 | Zhong | G06F 3/0482 |
| 2017/0142072 A1* | 5/2017 | Reubenstein | H04L 63/0281 |
| 2017/0171235 A1* | 6/2017 | Mulchandani | H04L 63/1425 |
| 2017/0214701 A1* | 7/2017 | Hasan | H04L 63/1408 |
| 2017/0223030 A1* | 8/2017 | Merza | H04L 63/1416 |
| 2017/0223046 A1* | 8/2017 | Singh | H04L 43/062 |
| 2017/0230389 A1* | 8/2017 | Cochenour | H04L 63/145 |
| 2017/0236077 A1* | 8/2017 | Venna | G06F 16/2428 705/7.28 |
| 2017/0236079 A1* | 8/2017 | Venna | G06F 16/2428 705/4 |
| 2017/0250997 A1* | 8/2017 | Rostamabadi | H04L 63/1416 |
| 2017/0251002 A1* | 8/2017 | Rostamabadi | H04L 63/1425 |
| 2017/0251003 A1* | 8/2017 | Rostami-Hesarsorkh | H04L 63/1425 |
| 2017/0251013 A1* | 8/2017 | Kirti | H04L 63/1416 |
| 2017/0318050 A1* | 11/2017 | Hassanzadeh | H04L 63/1433 |
| 2017/0324768 A1* | 11/2017 | Crabtree | H04L 63/1441 |
| 2017/0353483 A1* | 12/2017 | Weith | H04L 63/1433 |
| 2017/0359220 A1* | 12/2017 | Weith | H04L 41/0893 |
| 2018/0013771 A1* | 1/2018 | Crabtree | H04L 63/1433 |
| 2018/0032316 A1* | 2/2018 | Dinga | G06F 8/33 |
| 2018/0046928 A1* | 2/2018 | Jang | G06N 5/048 |
| 2018/0048661 A1* | 2/2018 | Bird | H04L 63/1416 |
| 2018/0048662 A1* | 2/2018 | Jang | H04L 63/1425 |
| 2018/0048668 A1* | 2/2018 | Gupta | H04L 63/1425 |
| 2018/0054452 A1* | 2/2018 | Muddu | G06F 16/254 |
| 2018/0069888 A1* | 3/2018 | Muddu | G06F 16/254 |
| 2018/0089561 A1* | 3/2018 | Oliner | G06N 3/0454 |
| 2018/0091528 A1* | 3/2018 | Shahbaz | H04L 63/1416 |
| 2018/0091529 A1* | 3/2018 | Luger | H04L 63/1483 |
| 2018/0091559 A1* | 3/2018 | Luger | H04L 63/302 |
| 2018/0146000 A1* | 5/2018 | Muddu | G06F 16/254 |
| 2018/0159876 A1* | 6/2018 | Park | G06F 16/9024 |

OTHER PUBLICATIONS

Yin, et al., "Whole-system Fine-grained Taint Analysis for Automatic Malware Detection and Analysis", In Technical paper of College of William and Mary & Carnegie Mellon University, Jul. 2006, pp. 1-14.

Camilo, et al., "Identifying compromised systems through correlation of suspicious traffic from malware behavioral analysis", In Proceedings of Spie, vol. 9826, Cyber Sensing 2016, May 12, 2016, 10 Pages.

"International Search Report and Written Opinion Issued in PCT Application No. PCT/US2018/039646", dated Sep. 18, 2018, 10 Pages.

\* cited by examiner

INTRUSION DETECTION

BACKGROUND

Information security services and digital forensics services relate to the investigation and prevention of digital intrusions, such as the breach and exploitation of computer systems and networks, and can include intrusion detection systems. An intrusion detection system is a device or software application that monitors a network or system for malicious activity or policy violation. Noted activities or violations can be reported to security information and event manager. The scope of intrusion detection systems can vary greatly, from antivirus software to hierarchical systems that monitor the traffic of an entire network. Intrusion detection systems can include host based intrusion detection systems and network based intrusion detection systems. Host based intrusion detection systems typically run on hosts or device that, for example, can monitor host based systems such as operating system files. Network based intrusion detection systems can analyze incoming network traffic. In some examples, intrusion detection systems can further include intrusion prevention mechanisms.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

An intrusion detection system in one example receives known compromised instances of systems or networks of interest having linked-together instances and seeks to discover additional compromised instances. By way of illustration, the links are followed from known compromised instances to discover the additional compromised instances. In one example, an intrusion detection system identifies plurality instance types, and each instance type includes an instance. In one example, each of the instance types includes a plurality of instances. Also, the instances of an instance types may be connected to one or more instances of another instance type via links. A known compromised instance is identified from the plurality of instances. A link between the plurality instance types is traversed from the compromised instance to discover an additional compromised instance. Once an additional compromised instance is discovered, it can be added to the list of known compromised instances, and the link traversal can be repeated.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
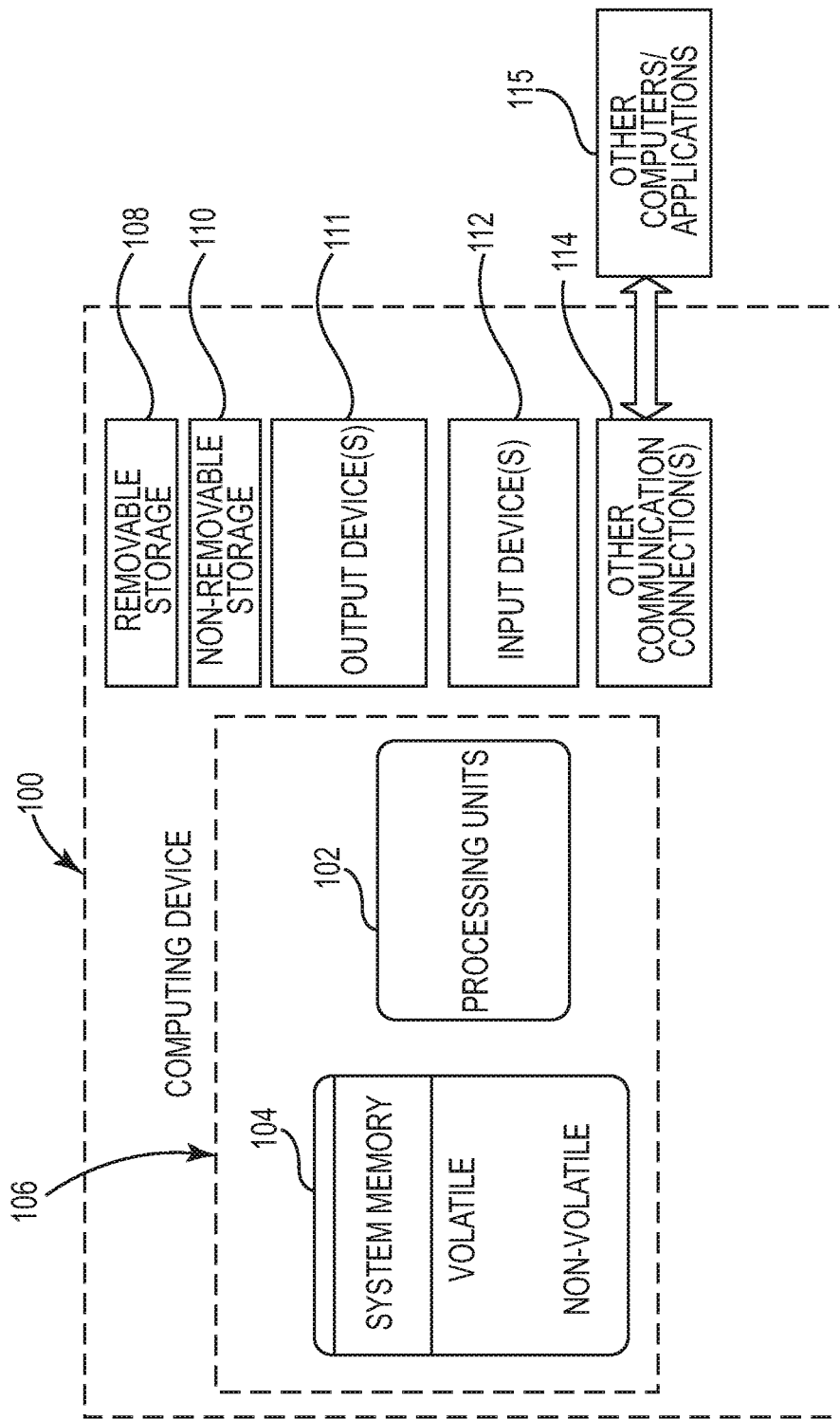
FIG. 1 is a block diagram illustrating an example of a computing device.

FIG. 1 illustrates an exemplary computer system that can be employed in an operating environment and used to host or run a computer application included on one or more computer readable storage mediums storing computer executable instructions for controlling the computer system, such as a computing device, to perform a process.

The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Figure 2:
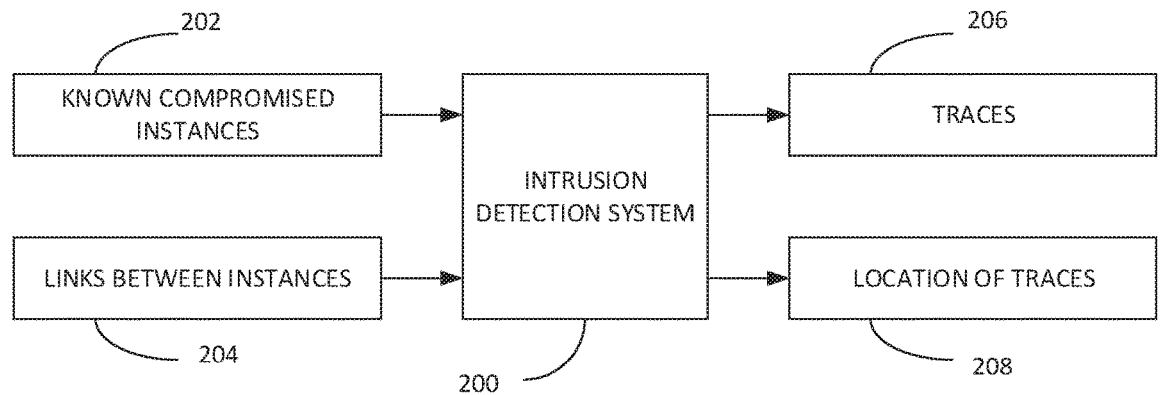
FIG. 2 is a schematic diagram illustrating an example intrusion detection system.

FIG. 2 illustrates an example intrusion detection system 200 for use in detecting traces left by an intruder, such as a hacker or attacker, in a system or network of interest. Traces can be artifacts observable on a network or system that provides an indication of a digital intrusion. In the example, the intrusion detection system 200 receives known, or previously identified compromised or malicious instances 202 on a system or network of interest and links between the instances 204 on the system or network of interest. The intrusion detection system 200 identifies traces left by the intruder 206 and identifies the locations 208 in the system or network of interest where these traces are present.

Intrusion detection system 200 can be implemented in a variety of forms for execution on a computing device, such as computing device 100, to detect additional intrusions on a system or network of interest. In one example, intrusion detection system 200 can be implemented as a stand-alone application or device, which may be used by computer security personnel or others on a selected system or networks of interest. In another example, intrusion detection system 200 can be implemented as part of a security services in a cloud environment to protect and secure the cloud-based assets and resources of network users, such as cloud tenants, from malicious communication or other threats as part of a platform as a service. In still another example, intrusion detection services may be provided as a software as a service to subscribers. In still another example, the intrusion detection system can be implemented as a library or resource that can be used to develop other security applications. Additional implementations are contemplated.

Systems and networks include instances that can be categorized into one or more types of instances (or instance types), and the various types of instances can be coupled together via links. For example, types of instances can include the categories of machines, network addresses, file names, file hashes, or other types of instances. Instances of type machine can include one or more devices used in the system or network of interest. In another example, instances of type network address type can include the network addresses that have accessed the system or network of interest. In this example, a simplified network of interest can include a bipartite graph (or bigraph) having vertices of a set of machines and a set of network addresses. The vertices of a set of machines as the instances of the type machine, and the vertices of a set of network addresses that have accessed the system or network of interest. The edges of the graph can link the network addresses to the machines accessed by the network addresses. Other graphs of links between instances besides bipartite graphs and other instances are contemplated.

Known compromised instances 202 can be those instances having an identified forensic artifact of intrusion. Examples of forensic artifacts of intrusion include virus signatures, Internet Protocol addresses that are known to belong to botnets or are otherwise controlled by attackers, hashes of malware files, or Universal Resource Locator or domain names of botnet command and control servers, and others. An investigator or an incident response system can discover evidence of an intrusion, and then identify the compromised instance, such as a machine, network address, or file name, and then provide the compromised instance as the known compromised instance 202 to the intrusion detection system 200.

Links between instances 204 can be received from various sources. For example, sources can be from within the systems and networks of interest or from sources outside of the systems and networks of interest. Example sources of links provided to the intrusion detection system can include event logs that can describe which network addresses have accessed which machines; directory listings that describe which files are present on which machines, Amcache entries (in an amcache.hve file on an operating system available under the trade designation Windows from the present assignee) that describe which executables (as identified by a file hash) have been run on which machines, geolocation and internet registry databases that associate network addresses with network providers (such as autonomous system number, internet service provider, organization) and geographic locations. Other example sources include auditing and logging facilities from logs such as bash history, application-specific logs and other audit logs.

Figure 3:
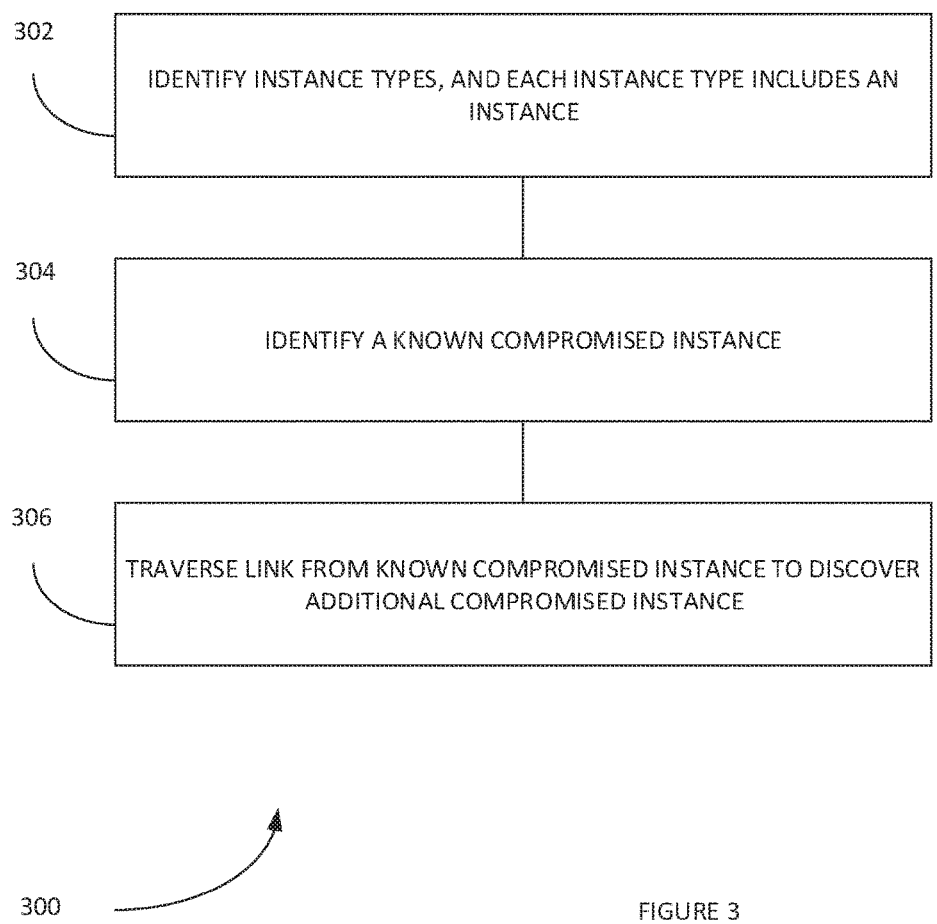
FIG. 3 is a block diagram illustrating an example method of the intrusion detection system of FIG. 2.

FIG. 3 illustrates an example method 300 for use with the example intrusion detection system 200. A plurality instance types, each instance type having an instance, are identified at 302. In one example, each of the instance types are includes a plurality of instances. Also, the instances of an instance types may be connected to one or more instances of another instance type via links. A know compromised instance, such as known compromised instance 202, is identified from the plurality of instances at 304. This can include one or more compromised instances from the plurality of instances. A link between the plurality instance types is traversed from the compromised instance to discover an additional compromised instance at 306. In one example, the more than one link is traversed to discover additional compromised instances. Once an additional compromised instance is discovered, it can be added to the list of known compromised instances, and the link traversal at 306 can be repeated. For example, one or more links between the plurality instance types are traversed from the additional compromised instance to discover still additional compromised instances.

In one example implementation of method 300, additional compromised instances can be discovered from following links that are incident on known compromised instances 202. As an illustration, a set of machines is determined to be compromised at 304. Links incident to the known compromised machines may indicate that a particular network address accessed the compromised machines. The network address may be included as an additional compromised instance at 306. Links incident to the now known compromised network address may indicate that it was used to log on onto additional machines, that may be included as additional compromised instances at 306. The method 300 can be repeated again, such as an examination made of what other network addresses accessed the additional machines to deduce additional addresses under the control of attackers or deduce other links to instance types.

In one example, the intrusion detection system 200 applying method 300 can detect compromised instances that occur in groups. By way of illustration, a compromised machine tends to be accessed by several network addresses under the control of attackers, attackers tend to copy more than one binary file to a compromised machine, attackers tend to attack several machines with the same malware files from a single network address, and network addresses under the control of attackers tend to lie in certain countries or belong to certain autonomous system numbers. Link traversal of method 300 can be applied to discover additional compromised instances of a system or network of interest.

Another example implementation of method 300 includes an optimization of a graph G=(V, E) in which the vertices V include the instances of various types of instance types (such as machines, network addresses, file hashes) from the systems or networks of interest and the edges E are links between instances 204. For example, a logon event recorded in an event log can associate a network address with a machine, and thus an edge is included between the pair of vertices of the network address and the machine. Additionally, each vertex V can include a state S, which is represented by a variable. In one example, the variable can be a binary variable such as compromised and not compromised. In this example, known compromised instances 202 can include vertices having a state set as compromised. In another example, the variable could include more than two possible values, such as probabilities of compromise or levels of confidence that the instance is compromised. In this example, known compromised instances 202 can include vertices having a state that exceeds a threshold value.

Method 300 presented as constrained optimization includes optimizing an objective function with respect to some variables in the presence of constraints on those variables. The objective function is either a cost function or energy function which is to be minimized, or a reward function or utility function, which is to be maximized. Constraints can be either hard constraints which set conditions for the variables that are required to be satisfied, or soft constraints which have some variable values that are penalized in the objective function if, and based on the extent that, the conditions on the variables are not satisfied. The constrained optimization can be solved with a variety of mechanisms.

In an example, an objective function of $f_E(S_1, S_2, \ldots, S_N)$ is defined on the variable states, such that $f_E$ is maximized (or minimized) by a state assignment $S_1, S_2, \ldots, S_N$ in which the state of the vertex is compromised or exceeds the threshold value if the instance represented by the vertex is compromised. Given such a function, the problem of finding compromised instances becomes a constrained optimization problem of min $f_E(S_1, S_2, \ldots, S_N)$. The constraints are given from the known compromised instances 202 having a state S that is constrained as compromised. The intrusion detection system 200 can apply an optimization algorithm to determine the state assignment. Examples of optimization algorithms suitable for use with the intrusion detection system 200 can include integer programming, linear programming, gradient descent, and simulated annealing.

In one example, the selected optimization determines a state assignment S that is an optimal state assignment that identifies the set of compromised instances. In another example, the selected optimization can determine a state assignment that approximates the set of compromised instances in which a discrepancy includes false positives, false negatives, or both.

An example application of the optimization can include a graph G of two instance types, i.e., machines and network addresses, to define a function $f_E$. In this example, the set of vertices is $V=V_M \cup V_A$ in which $V_M$ is the set of vertices corresponding to machines, and $V_A$ is the set of vertices corresponding to network addresses. The set of edges is given by the logon events, and an edge $\{m, a\} \in E$ is included between vertex $m \in V_M$ and vertex $a \in V_A$ if and only if there was a successful logon from network address a into machine m. The resulting graph G is bipartite having $V_M$ and $V_A$ as the two partitions. In this example, each vertex $v \in V$ includes a binary state $S_v \in \{0,1\}$, in which $S_v=1$ means that the vertex (machine or network address) is compromised and $S_v=0$ means that it is not compromised.

In this example, the function $f_E$ can be defined as:

$$f(S_{a1}, S_{a2}, \ldots, S_{m1}, S_{m2}, \ldots) = \alpha \sum_{e \in E} g(e) + \beta \sum_{m \in V_M} h(m) + \gamma \sum_{v \in V} S_v$$

in which $$g(\{a, m\}) = \begin{cases} 1 & \text{if } S_a = 1 \text{ and } S_m = 0 \\ 0 & \text{otherwise} \end{cases}$$

and $$h(a) = \begin{cases} \sum_{m \in N(a)} S_m & \text{if } S_a = 0 \text{ where } N(a) \text{ is the set of neighbors of } a \\ 0 & \text{otherwise} \end{cases}$$

The optimization problem is to find an assignment of the binary (0,1) values to the vertex states $S_{a1}, S_{a2}, \ldots, S_{m1}, S_{m2}, \ldots$ that minimizes $f(S_{a1}, S_{a2}, \ldots, S_{m1}, S_{m2}, \ldots)$ subject to the constraints of:

$$\bigwedge_{v \in B} S_v = 1$$

in which B is the set of vertices whose instances are known to be compromised, i.e., compromised instances 202.

In this example, $\alpha$, $\beta$, $\gamma$ are constants, and neighbors of a vertex, such as network address a, includes all vertices linked to an edge, such as machines linked to an address via logon events in the illustrated example.

The function g generates a penalty for each vertex/machine that includes a state of 0 (not compromised) but that has a successful logon from a compromised network address in the illustrated example. The intuition is that a successful logon from a compromised network address shows that a machine is compromised. Further, the function h generates a penalty for each network address that has state of 0 (not compromised) and that has been logged onto a machine (one or more compromised machines) in the illustrated example. The size of the penalty grows with the number of compromised machines the network address has logged onto. The intuition is that if a network address is found on many compromised machines, it may be the cause of the compromise. A non-linear function may also be used in this example. Still further, the final term in the function generates a penalty for variables set to 1 (compromised). The function attempts to avoid an optimal solution in which all state variables are determined to be compromised. The set of constraints, i.e., know compromised instances 202, avoids the other trivial solution in which all variables are set to 0 (not compromised).

The example intrusion detection system 200 and method 300 can be implemented to include a combination of one or more hardware devices and computer programs for controlling a system, such as a computing system having a processor and memory, to perform method 300 to discover additional instances of compromise on a system or network of interest. For example, the intrusion detection system 200 and method 300 can be implemented as a computer readable medium or computer readable device having set of executable instructions for controlling the processor to perform the method 300.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of detecting intrusions on a system or network, the method comprising:
   identifying a plurality of instance types in which each instance type includes an instance;
   identifying a compromised instance having an identified forensic artifact of intrusion from the plurality of instance types;
   traversing a link between instance types from the compromised instance to discover an additional compromised instance having a previously unidentified forensic artifact of intrusion via constrained optimization including optimizing an objective function with respect to variables in the presence of constraints on the variables; and
   adding the additional compromised instance to a list of known compromised instances.

2. The method of claim 1 wherein the additional compromised instance becomes the compromised instance, and another link from the compromised instance is traversed to discover still another compromised instance.

3. The method of claim 1 wherein each of the plurality of instance types includes a plurality of instances.

4. The method of claim 3 wherein the plurality of instance types includes a first instance type and a second instance type, and an instance of a first instance type is connected to an instance of the second instance type via the link.

5. The method of claim 4 wherein instance of the first instance type are connected to the instances of the second instance type via a plurality of links.

6. The method of claim 1 wherein the instance types include at least two of network addresses, machines, file names, and file hashes.

7. The method of claim 6 wherein the link is determined from an event log or directory listing.

8. The method of claim 1 wherein each instance includes a state.

9. The method of claim 8 wherein each state is either compromised or not compromised.

10. The method of claim 8 wherein all instances are neither not compromised nor compromised.

11. A computer readable storage device, which is not a transitory propagating signal, to store computer executable instructions to control a processor to:
    identify a plurality of instance types in which each instance type includes an instance;
    identify a compromised instance having an identified forensic artifact of intrusion from the plurality of instance types;
    traverse a link between instance types from the compromised instance to discover an additional compromised instance having a previously unidentified forensic artifact of intrusion via constrained optimization including optimize an objective function with respect to variables in the presence of constraints on the variables; and
    add the additional compromised instance to a list of known compromised instances.

12. The computer readable storage device of claim 11 wherein each of the instance types includes a plurality of instance, and instances from one of the plurality of instance types are connected to instances from another of the plurality of instance types via a plurality of links.

13. The computer readable storage device of claim 12 wherein the compromised instance is from the one of the instance plurality of instance types and the additional compromised instance is from the other of another of the plurality of instance types.

14. The computer readable storage device of claim 12 wherein the instances of the plurality of instance types are vertices in a graph, the plurality of instance types are partitions on the graphs, and the links are edges of the graph.

15. The computer readable storage device of claim 11 wherein in the constrained optimization the compromised instance is a constraint.

16. The computer readable storage device of claim 15 wherein the constrained optimization includes integer programming, linear programming, gradient descent, or simulated annealing.

17. A system, comprising:
    a memory device to store a set of instructions; and
    a processor to execute the set of instructions to:
      identify a plurality of instance types in which each instance type includes an instance;
      identify a compromised instance having an identified forensic artifact of intrusion from the plurality of instance types;
      traverse a link between instance types from the compromised instance to discover an additional compromised instance having a previously unidentified forensic artifact of intrusion via constrained optimization including optimize an objective function with respect to variables in the presence of constraints on the variables; and
    add the additional compromised instance to a list of known compromised instances.

18. The system of claim 17 wherein each of the instance types includes a plurality of instance, and instances from one of the plurality of instance types are connected to instances from another of the plurality of instance types via a plurality of links.

19. The system of claim 18 wherein the instance types include at least two of network addresses, machines, file names, and file hashes and the link is determined from an event log or directory listing.

20. The system of claim 18 implemented as a security service in a cloud environment.

* * * * *